(12) United States Patent
Wales

(10) Patent No.: US 7,909,526 B2
(45) Date of Patent: Mar. 22, 2011

(54) GRILL BRUSH

(76) Inventor: Michael Wales, Riverside, CT (US)

( * ) Notice: Subject to any disclaimer, the term of this patent is extended or adjusted under 35 U.S.C. 154(b) by 1142 days.

(21) Appl. No.: 11/566,359

(22) Filed: Dec. 4, 2006

(65) Prior Publication Data

US 2007/0231054 A1 Oct. 4, 2007

Related U.S. Application Data

(60) Provisional application No. 60/787,019, filed on Mar. 29, 2006.

(51) Int. Cl.
*A46B 11/00* (2006.01)

(52) U.S. Cl. ............... 401/39; 401/25; 401/37; 401/270

(58) Field of Classification Search .................. 401/16, 401/25, 26, 37–39, 270, 280, 291, 261, 263, 401/266
See application file for complete search history.

(56) References Cited

U.S. PATENT DOCUMENTS

| 2,203,361 | A | * | 6/1940 | Pound ................................ 401/1 |
| 2,625,302 | A | * | 1/1953 | Mahoney ......................... 222/82 |
| 2,630,594 | A | | 3/1953 | Fisher |
| 2,772,430 | A | * | 12/1956 | Moritt ............................ 401/151 |
| 4,229,116 | A | * | 10/1980 | Moore ............................ 401/275 |
| 4,826,340 | A | | 5/1989 | Rothweiler |
| 6,250,833 | B1 | | 6/2001 | Perry |
| 6,412,997 | B2 | * | 7/2002 | Berke et al. ........................ 401/6 |
| 6,425,701 | B1 | | 7/2002 | Jacobs |
| 6,443,646 | B1 | | 9/2002 | MacDonald |
| 6,962,456 | B2 | | 11/2005 | Larsen |
| 7,040,830 | B2 | | 5/2006 | Kliegman |
| 7,047,590 | B2 | * | 5/2006 | Neal et al. ........................ 15/111 |
| 2004/0105715 | A1 | | 6/2004 | Spelman |
| 2004/0265042 | A1 | | 12/2004 | Chan |
| 2005/0069375 | A1 | | 3/2005 | Kliegman |

* cited by examiner

*Primary Examiner* — David J Walczak
(74) *Attorney, Agent, or Firm* — St. Onge Steward Johnston & Reens LLC

(57) ABSTRACT

A grill brush having a brush handle with a handle end and a brush end, the brush head having a fluid reservoir, a brush handle conduit and a valve located therein; a reservoir cap removeably attached to the handle end of the brush handle; the valve being in fluid communication with the reservoir; the brush handle conduit being in fluid communication with the valve; a brush head; a bristle holding member; a brush bristle surface located on the bristle holding member; a brush head conduit located in the brush head, and in fluid communication with the brush handle conduit; a plurality of groups of bristles emanating from the brush bristle surface; a plurality of orifices located on the brush bristle surface, and in communication with the brush head conduit; and a scraper is provided herein.

10 Claims, 12 Drawing Sheets

GRILL BRUSH

CROSS-REFERENCES

This patent application claims the benefit of provisional patent application Ser. No. 60/787,019 by Michael Wales, entitled "Grill Brush", filed on Mar. 29, 2006, the entire contents of which are fully incorporated by reference herein.

TECHNICAL FIELD

The present invention relates to grill brushes and more particularly relates to a new grill brush for cleaning the grates of a grill while also applying a cleaning fluid.

BACKGROUND

The present invention pertains to grill brushes for cleaning grill grates such as the grates of gas fired barbecue grills, and charcoal fired barbecue grills.

The use of brushes and scrapers for the cleaning of grill grates of gas grills is well known. Typically, grill brushes have a head portion and a handle portion. Grill brushes known in the art typically have metallic bristles, which are generally all of a constant length and form a generally planar abrasive surface. This bristle configuration permits the top surface of the grill to be scrubbed with the grill brush but does not facilitate the cleaning of the sides of the grill grate bars. With known grill brushes it is therefore difficult to remove accumulated deposits from the sides of the grate bars without significant effort.

It would therefore be desirable to have a grill brush that more effectively removes deposits and grease from the sides of the grate bars of a grill grate while also removing deposits from the top surface of the grate. In addition, it is desirable to have a grill brush that can be used to clean the inside and outside of a grill, and remove deposits from hard to reach crevices.

SUMMARY

The disclosed invention relates to a grill brush comprising: a brush handle with a handle end and a brush end; a fluid reservoir located within the brush handle; a reservoir cap removeably attached to the handle end of the brush handle; a valve located in the brush handle, and in fluid communication with the reservoir; a brush handle conduit located generally in the brush end of the brush handle, and in fluid communication with the valve; a brush head comprising: a front end; a handle end in communication with the brush end of the brush handle; a bristle holding member located generally at the front end; brush bristle surface located on the bristle holding member; a brush head conduit located in the brush head, and in fluid communication with the brush handle conduit; a plurality of groups of bristles emanating from the brush bristle surface; a plurality of orifices located on the brush bristle surface, and in communication with the brush head conduit; and a scraper attached to the front end of the brush head.

In addition, the disclosed invention relates to a grill brush comprising: a brush handle with a handle end and a brush end; a handle member attached to the handle end, and located at generally an acute angle to the brush handle; a knob located generally in the middle of the brush handle a fluid reservoir located within the brush handle, the fluid reservoir comprising: an upper interior volume; and a lower interior volume; a reservoir cap removeably attached to the handle end of the brush handle; a shut off spool removeably attachable to the brush handle, and located generally between the upper interior volume and the lower interior volume; a passage way located in the shut off spool, and configured to stop fluid communication between the upper interior volume, and the lower interior volume when the spool is in a shut configuration, and to allow for fluid communication between the upper interior volume, and the lower interior volume when the spool is in an open configuration; a scraper brush holder removeably attachable to the brush end of the brush handle; a brush head slideably attachable to the scraper brush holder, the brush head comprising: a brush head conduit, configurable to be in fluid communication with the lower interior volume; a brush bristle surface located on the bristle holding member; a plurality of groups of bristles emanating from the brush bristle surface; and a plurality of orifices located on the brush bristle surface, and in fluid communication with the brush head conduit.

BRIEF DESCRIPTION OF THE DRAWINGS

The present disclosure will be better understood by those skilled in the pertinent art by referencing the accompanying drawings, where like elements are numbered alike in the several figures, in which.

DETAILED DESCRIPTION

Figure 1:
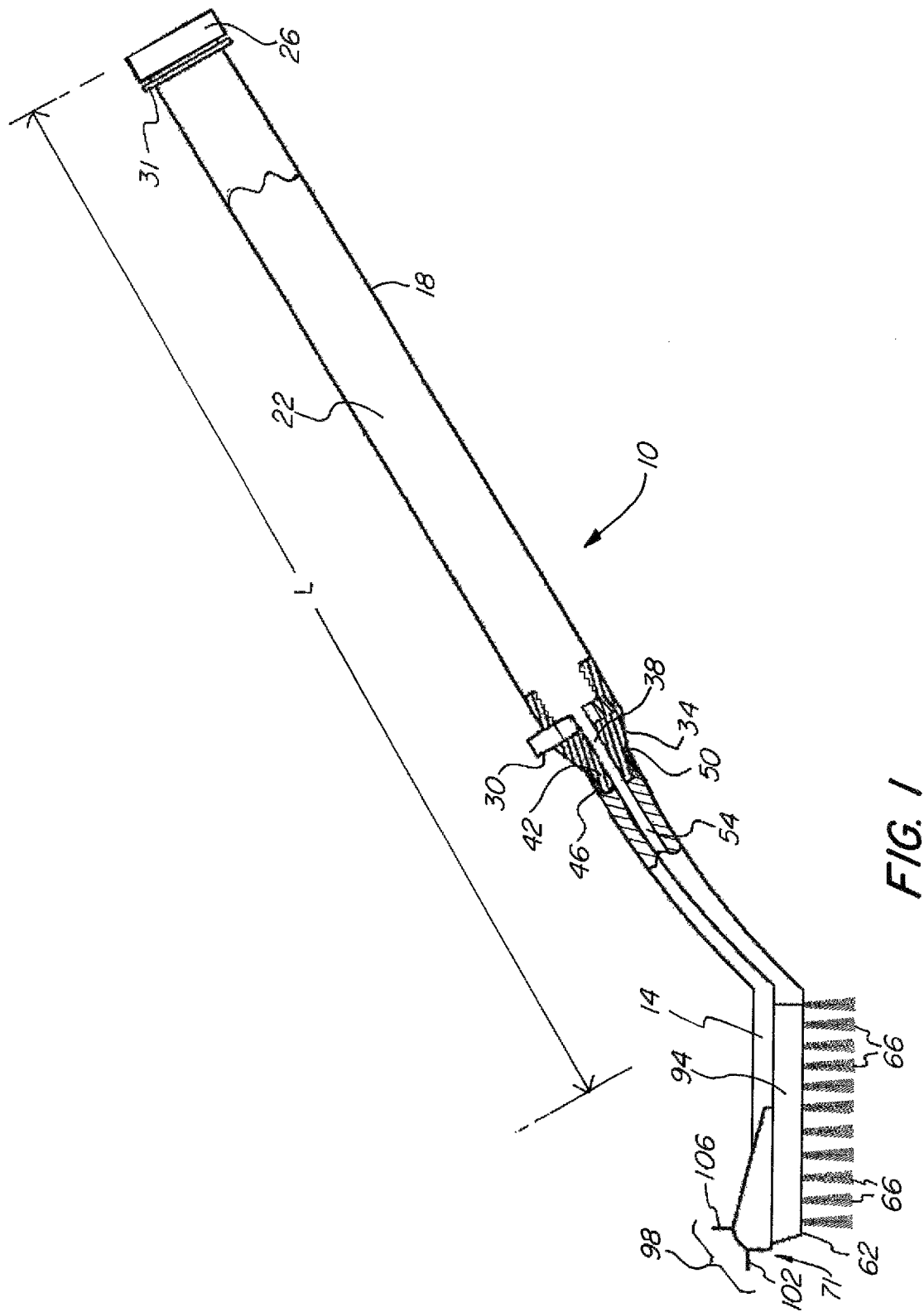
FIG. 1 is a side partial cross-sectional view of one embodiment of the disclosed grill brush.

FIG. 1 is a side, partial cross-sectional view of one embodiment of the disclosed grill brush 10. The grill brush 10 comprises brush head 14, and a brush handle 18. The brush handle 18 is attachable to the brush head 14 via threaded mating surfaces (shown in FIG. 2). The brush handle comprises a reservoir 22, and a reservoir cap 26. The reservoir cap is located on the handle end 31 of brush handle 18. The reservoir 22 is configured to releasably hold a fluid within it. Located in the brush handle is a valve 30 in fluid communication with the reservoir 22. The valve 30 will be discussed in more detail in FIG. 2. Located in the brush end 34 of the brush handle 18 is a brush handle conduit 38. The brush handle conduit 38 is in fluid communication with the valve 30. On the brush end 34 of the brush handle 18 are male threads 42. The male threads 42 are configured to attach to female threads 46 on the handle end 50 of the brush head 14. A brush head conduit 54 is located in the brush head 14, and is in fluid communication with the brush handle conduit 38. The brush head 14 has a bristle holding member 94 with a brush bristle surface 62 with brush bristles 66 extending therefrom. These bristles 66 may have a diameter of about 0.005 inches to about 0.012 inches in diameter and preferably about 0.008 inches in diameter. The brush head 14 has a front end 71. Attached to the front end 71 of the brush head 14 is a scraper 98 configured to scrape materials off grill grates. The scraper 98 may comprise two scraping elements 102, 106. The scraper 98 may be removeably attachable to the front end 71 of the brush 10. Other scraper configurations may be supplied with the grill brush 10, to allow a user to change the type of scraper he wants to attach to the grill brush. One scraper may be used for scraping of the grill grate, another scraper may be configured for reaching into corners, and underneath grill grates. In addition, a very stiff bristle brush may be attached to the front end 71. The bristles may be from about 0.008 inches to 0.020 inches in diameter and preferably about 0.016 inches in diameter. The length L of the brush handle 18 and the brush head 14 up to the bristle holding member 94 may be about 12 inches to about 30 inches. This length is longer than prior art grill brushes, and allows a user to use more leverage when using the grill brush 10, thus allowing for easier cleaning. The brush head may be removed for dishwasher cleaning.

Figure 2:
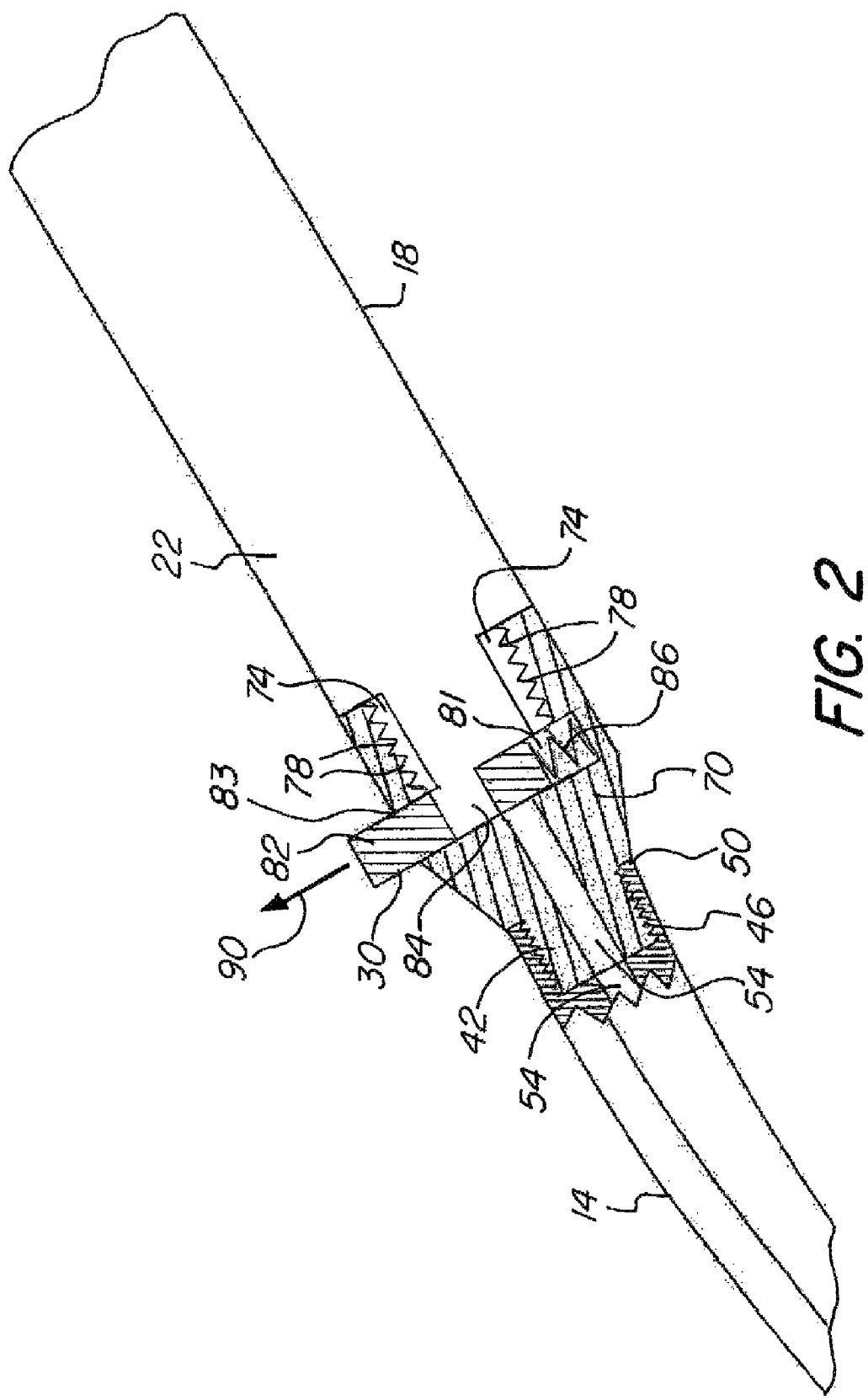
FIG. 2 is a partial cross-sectional view showing a detail of the valve.

FIG. 2 shows a detailed, partial cross-sectional view of the brush head 14 and brush handle 18 interface. The brush handle comprises a valve housing 70. The reservoir 22 attaches to the valve housing 70 via male threads 74 located on the reservoir 22. The male threads 74 mate with female threads 78 located on the valve housing 70. The valve 30, located in the valve housing 70, comprises a valve channel 81, a compression spring 86 located in a first end of the valve channel 81, a plunger orifice 83 located in the second end of the valve channel 81 and located on the brush handle 18, a plunger 82 configured to slide into and out of the plunger orifice 83, and to slide along the valve channel 81, and a plunger passageway 84 in the plunger 82. The plunger 82 extends out of the brush handle 18, through the plunger orifice 83. When the plunger 82 is at rest, the compression spring 86 exerts a force in the direction of the arrow 90, thus forcing the plunger 82 to extend out of the plunger orifice 83 such that the plunger passageway 84 is not in fluid communication with the reservoir 22 and brush head conduit 54. When the plunger 82 is pushed in a direction opposite of the arrow 90, then the plunger passageway 84 moves into the plunger orifice 83 until the plunger passageway 84 is in fluid communication with both the reservoir 22 and the brush head conduit 54. FIG. 2 shows the plunger 82 in an intermediate position where the plunger passageway 84 is partly in fluid communication with the reservoir 22, but not in fluid communication with the brush head conduit 54. Although a plunger valve is shown in FIG. 2, any suitable valve may be used to control the amount of fluid traveling from the reservoir 22 to the orifices 58, such valves include, but are not limited to: petcock valve, stop valve, globe valve, butterfly valve, gate valve, and ball valve.

Figure 3:
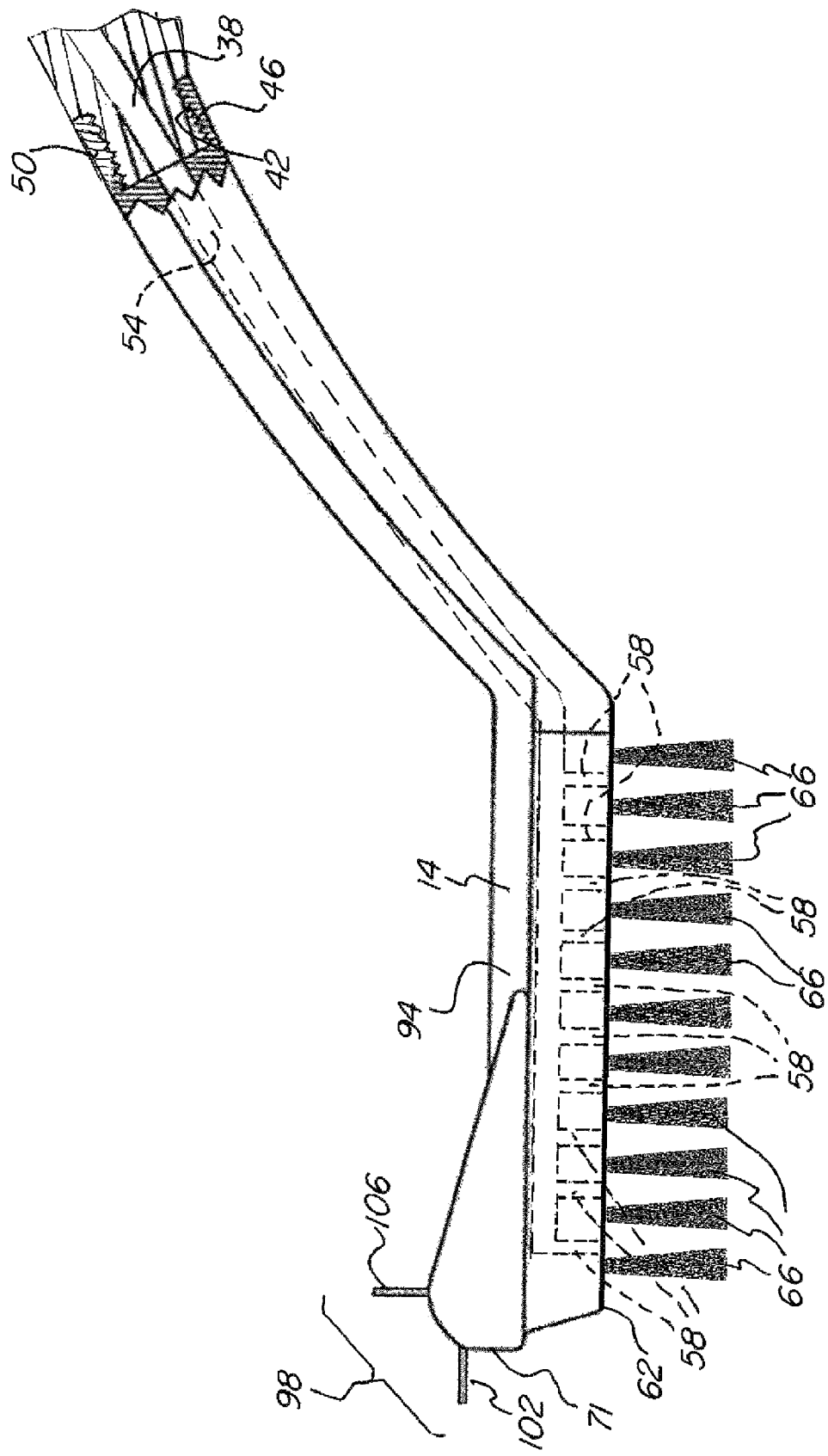
FIG. 3 is a partial cross-sectional view showing a detail of the brush head.

FIG. 3 shows a detailed, partial cross-sectional view of the brush head 14. The brush head conduit 54 is shown in dashed line traveling from the handle end 50 of the brush head 14, to the interior of a bristle holding member 94 of the brush head 14. The brush head conduit 54 is in fluid communication with a plurality of orifices 58 located on the brush bristle surface 62. The orifices 58 are distributed in-between the brush bristles 66. On or near the front end 71 of the brush is a scraper 98. The scraper 98 may comprise two scraping elements 102, 106. The scraping elements 102, 106 may be made out of metal, or hard plastic.

Figure 4:
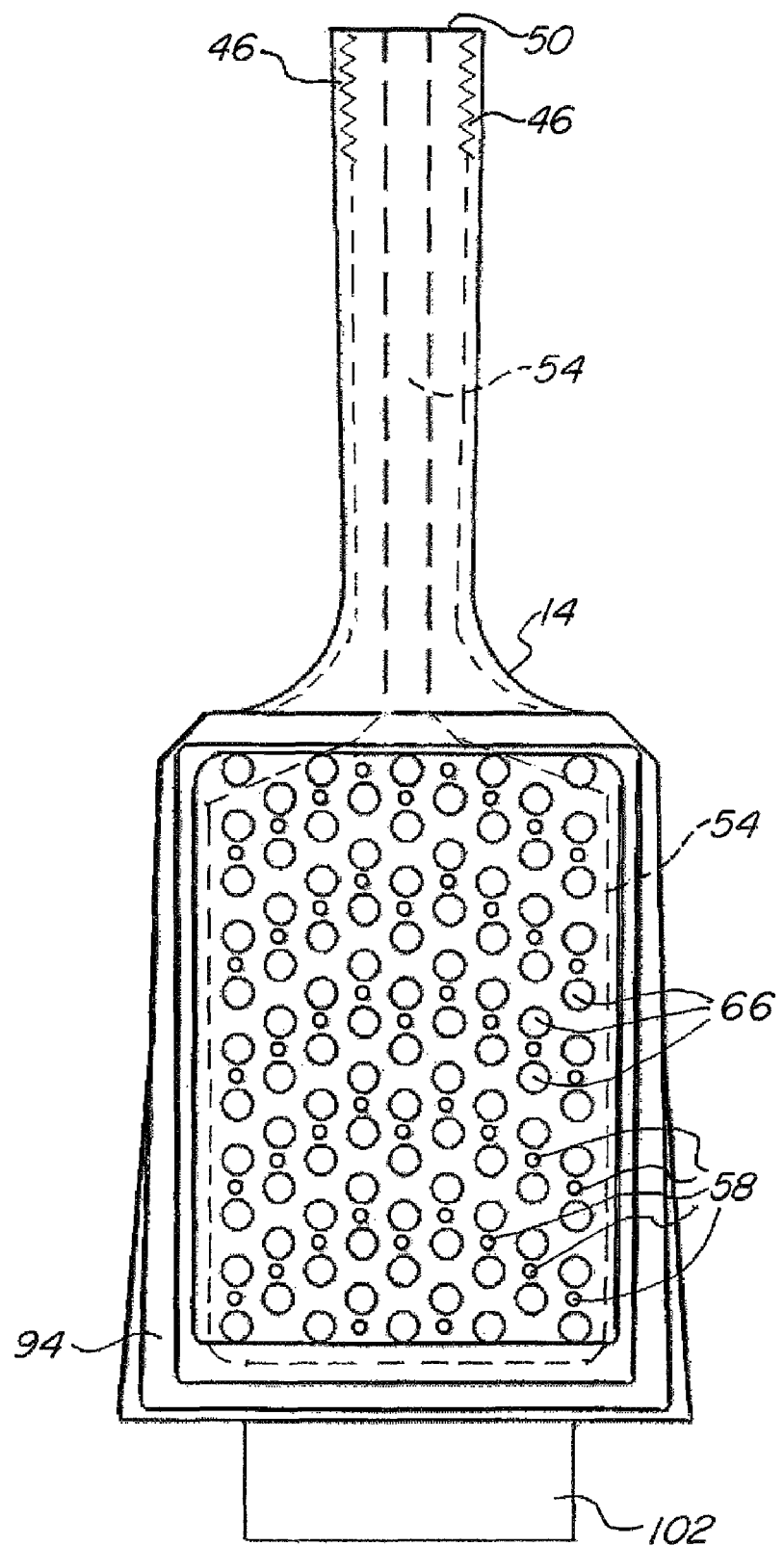
FIG. 4 is a bottom view of the brush head.

FIG. 4 is a bottom view of the brush head 14. The brush head conduit 54 is shown in dashed line traveling from the handle end of the brush head 50 to the interior of the bristle holding member 94. The brush head conduit 54 is in fluid communication with orifices 58. The orifices 58 are shown distributed between the bristles 66.

Figure 5:
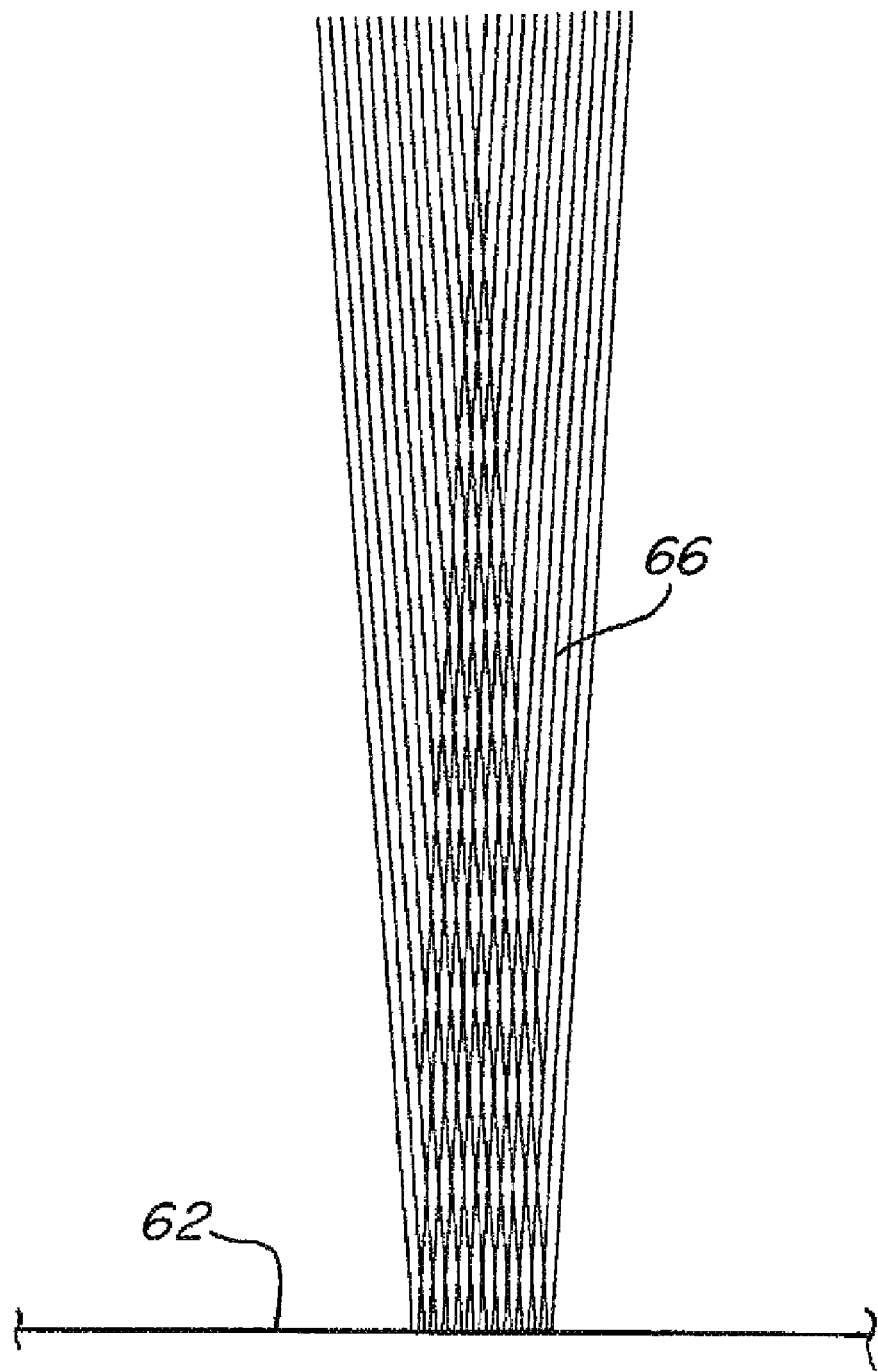
FIG. 5 is a front view of a bristle group.

FIG. 5 is a side close up view of a single group of brush bristles 66 emanating from the brush bristle surface 62. In this view, a distinctive "V" shape of the bristles 66 can be seen. This "V" shape group of bristles 66 allows for better cleaning and removing of matter from grill grates, cleaning corners, and for hard to reach crevices. The bristles 66 may be made out of stainless steel, thereby preventing the bristles from rusting.

Figure 6:
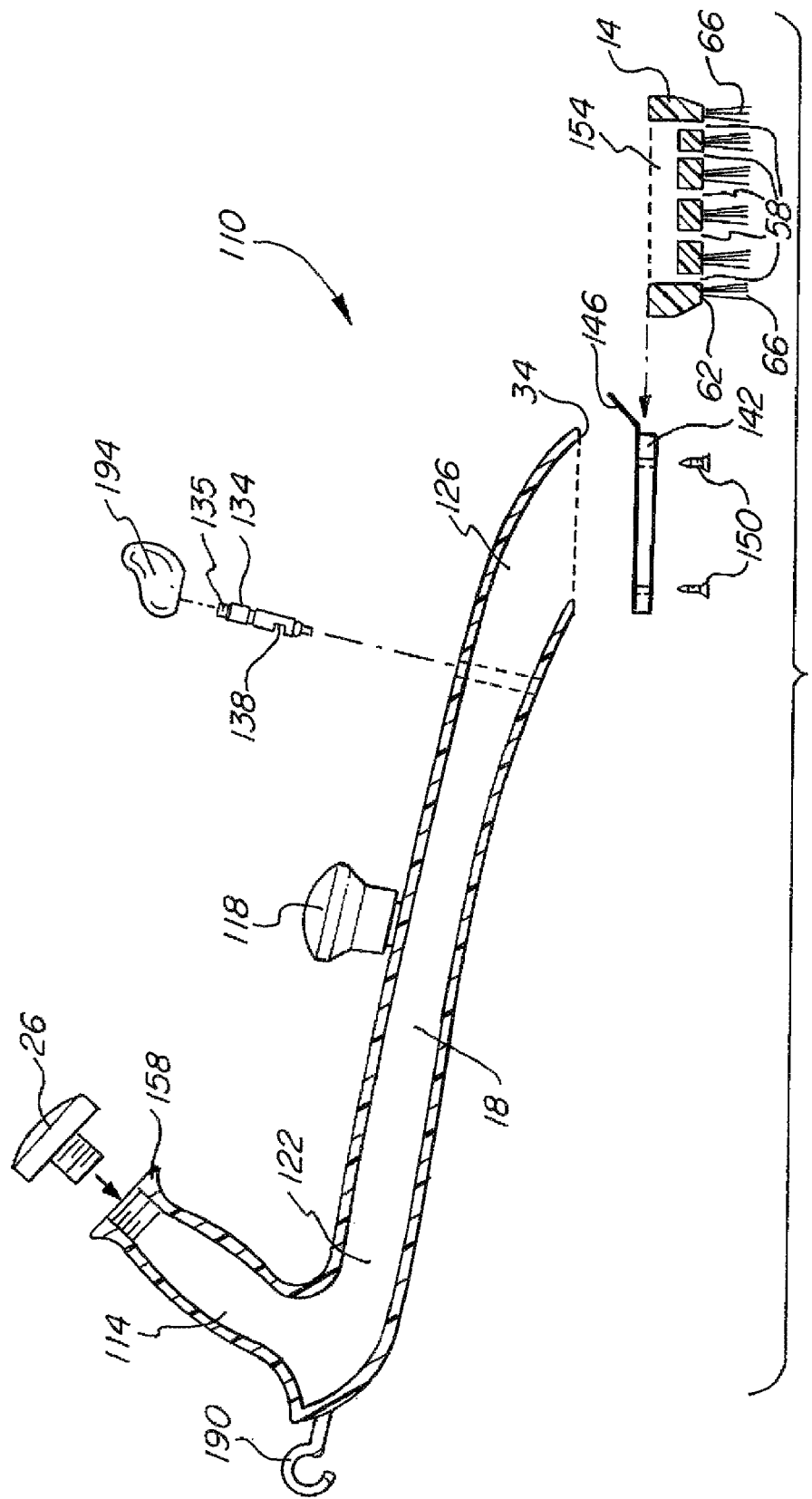
FIG. 6 is a cross-sectional view of another embodiment of a grill brush.
Figure 8:
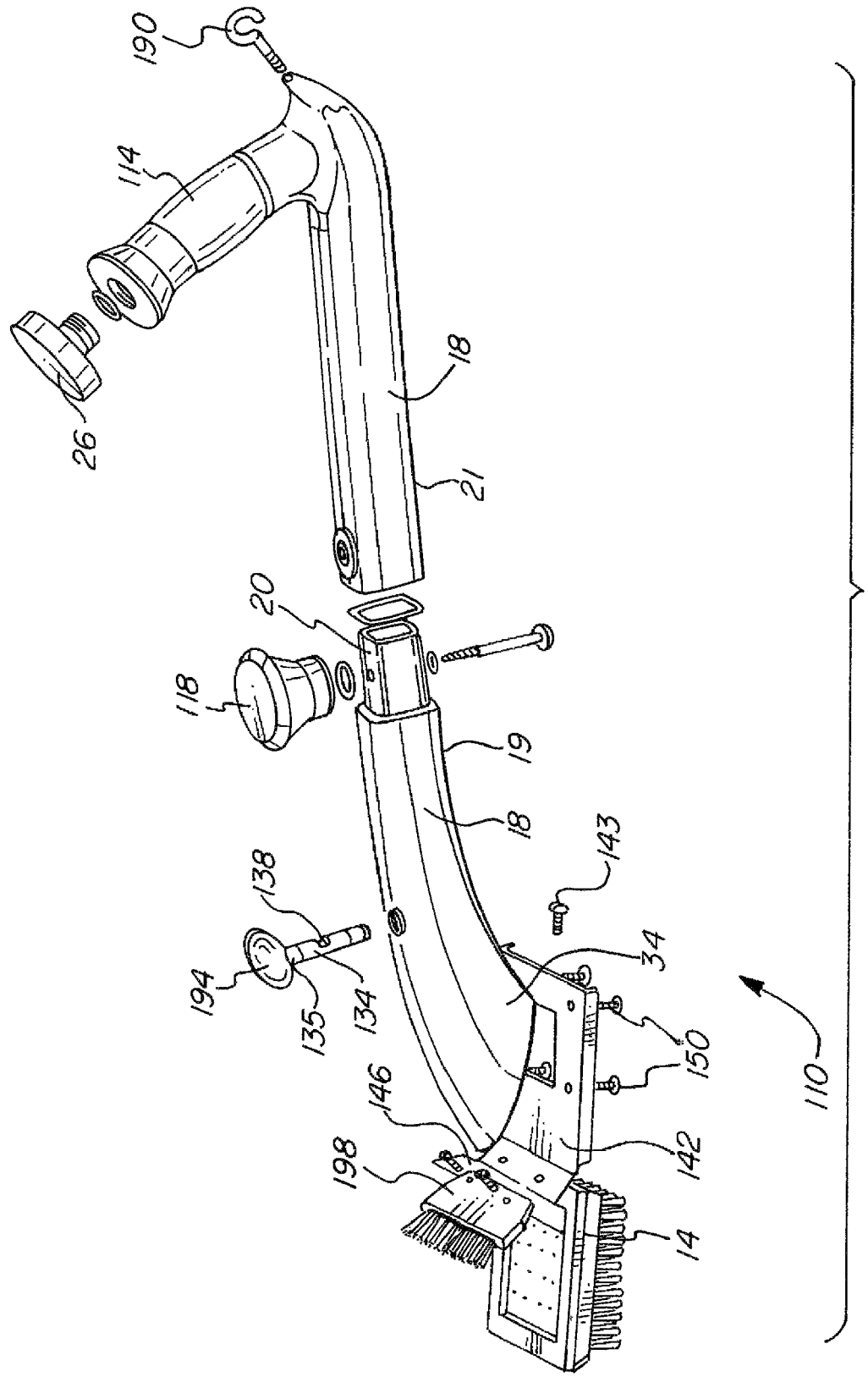
FIG. 8 is an exploded view of the grill brush from FIG. 6.

FIG. 6 shows a cross-sectional view of another embodiment of the disclosed grill brush 110. In this embodiment, the grill brush handle 18 has an handle member 114 that is at generally an acute angle with the brush handle 18. Located generally in the middle of the brush handle 18 is a knob 118. The handle member 114 allows a user to grip the handle member 114 securely with one hand, while holding the knob 118, giving the user the ability to apply greater force on the grill brush 110 in order to clean the grill. A shut off spool 134 is removeably attachable to the interior of the grill brush handle 18. A spool knob 194 may be removeably attached to the top 135 of the spool. The shut off spool allows a user to allow or stop fluid from entering the upper interior volume 122 of the handle into the lower interior volume 126 of the handle 18. There is a passageway 138 in the spool 134. The spool 134 is such that when it is rotated with respect to the handle 18, fluid may flow through the passage way 138, or if further rotated, the passageway 138 is no longer fluid communication with both the upper interior volume 122 and the lower interior volume 126, thus preventing the flow of fluid into the lower interior volume 126. A scraper brush holder 142 is removeably attachable to the brush end 34 of the brush handle 18. The scraper brush holder 142 has a scraper 146 located at an angle to the scraper brush holder 142. The scraper 146 may also comprise a brush with very stiff bristles as shown in FIG. 8. The scraper brush holder 142 may be attachable to the brush end 32 via attachment means such as, but not limited to, screws 150. A slideably attachable brush head 14 is configured to slide onto the scraper brush holder 142, and be held tightly in place via the screws 150, or other attachment means. A brush head conduit 154 is in fluid communication with the lower interior volume 126. A plurality of orifices 58 located on a brush bristle surface 62. The orifices 58 are distributed inbetween brush bristles 66. A removable reservoir cap 26 is attachable to a distal end 158 of the handle member 114. When the cap 26 is removed, fluid can be introduced into the upper interior volume 122, and/or removed from the upper interior volume 122. The grill brush 110 may have a hanging means 190 attached to the handle member 114. The hanging means 190 allows for the hanging and storage of the grill brush 110.

Figure 7:
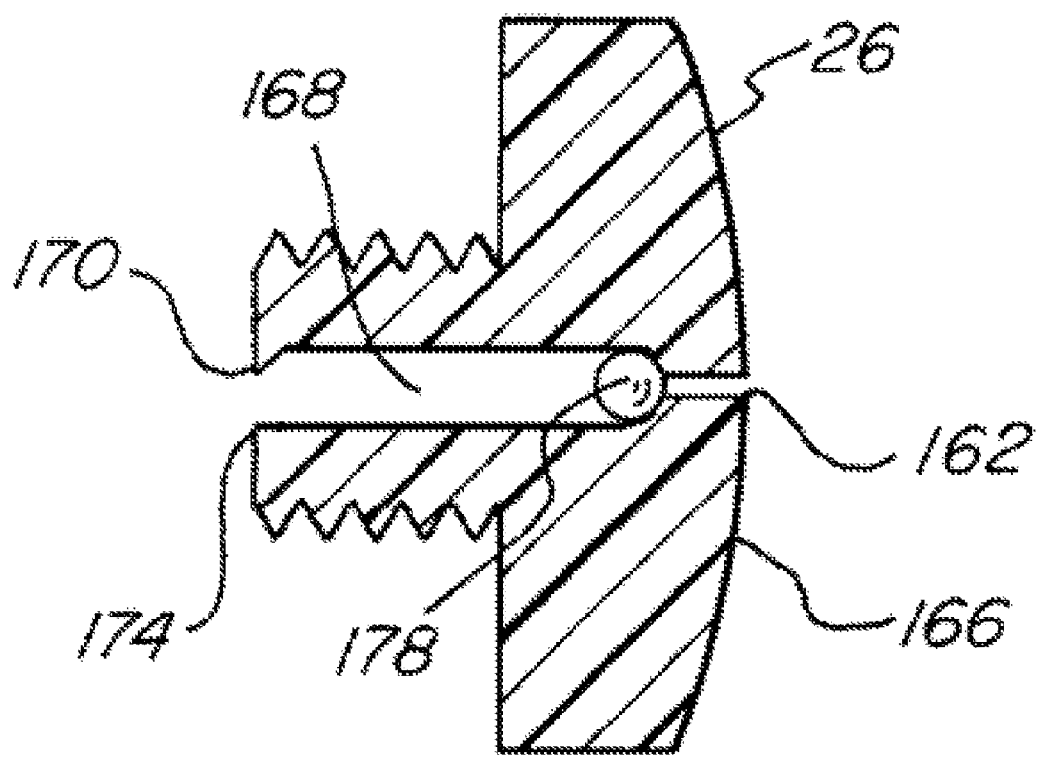
FIG. 7 is a cross-sectional view of a reservoir cap.

FIG. 7 is a cross-sectional view of the cap 26 from FIG. 6. The cap 26 may have a shut-off system that allows for fluid to pass from the upper interior volume 122 into the lower interior volume 126 and out the orifices 58, while preventing leaking of fluid out of the grill brush 110. A cap orifice 162 is located on the distal end 166 of the cap 26, and is in fluid communication with the ambient environment. A cap conduit 168 is in fluid communication with the cap orifice 162. A generally spherical stopper 178 is configured to be able to generally freely travel along the length of the cap conduit 168. At least one raised member 170 is located on a proximal end 174 of the cap conduit 168. The raised member 170 stops the stopper 178 from moving further out of the conduit towards the proximal end 174 of the conduit. The raised member 170 keeps the cap conduit 168 in fluid communication with the upper interior volume 122, when the cap 26 is attached to the grill brush 110. When the cap 26 is screwed into the distal end 158 of the handle member 114, the cap conduit 168 is in fluid communication with the upper interior volume of the handle 122. When the stopper 178 is up against the orifice 162, the cap conduit 168 is no longer in fluid in fluid communication with the cap orifice 162, and also the ambient environment. Gravity acts on the stopper 178, so that when the grill brush 110 is held "upside down", that is with the distal end 158 generally pointing in a downward direction, the stopper 178 will move up to and against the cap orifice 162, thus preventing the cap conduit 168 from being in fluid communication with the cap orifice 162. When the grill brush 110 is held "right side up", that is with the distal end 158 generally pointing in an upward direction, the stopper will be located generally at the proximal end of the cap conduit168 (resting against the raised members 170), thus allowing the cap conduit 168 to be in fluid communication with the cap orifice 162 and the upper interior volume 122. This reservoir cap 26 may be used with the grill brush 10 of FIG. 1 and brush 110 of FIG. 6.

FIG. 8 shows another exploded view of the disclose grill brush 110. In this embodiment, the handle 18 comprises a lower handle 19 that has a extended member 20 that is configured to slide into the upper handle 21. It should be noted that when the handle 18 is assembled, the upper interior volume 122 extends from the handle member 114, through the upper handle 21 through the extended member 20, and down the lower handle 19 to the spool 134. The lower interior volume 126 extends from the spool 134 down to the brush end 34 of the lower handle 19. Further, in this view, one can see that a stiff brush 198 is attachable to the scraper 146. One can also see that the brush head 14 is slideable onto the scraper brush holder 142 and held in place by a screw 143.

Figure 9:
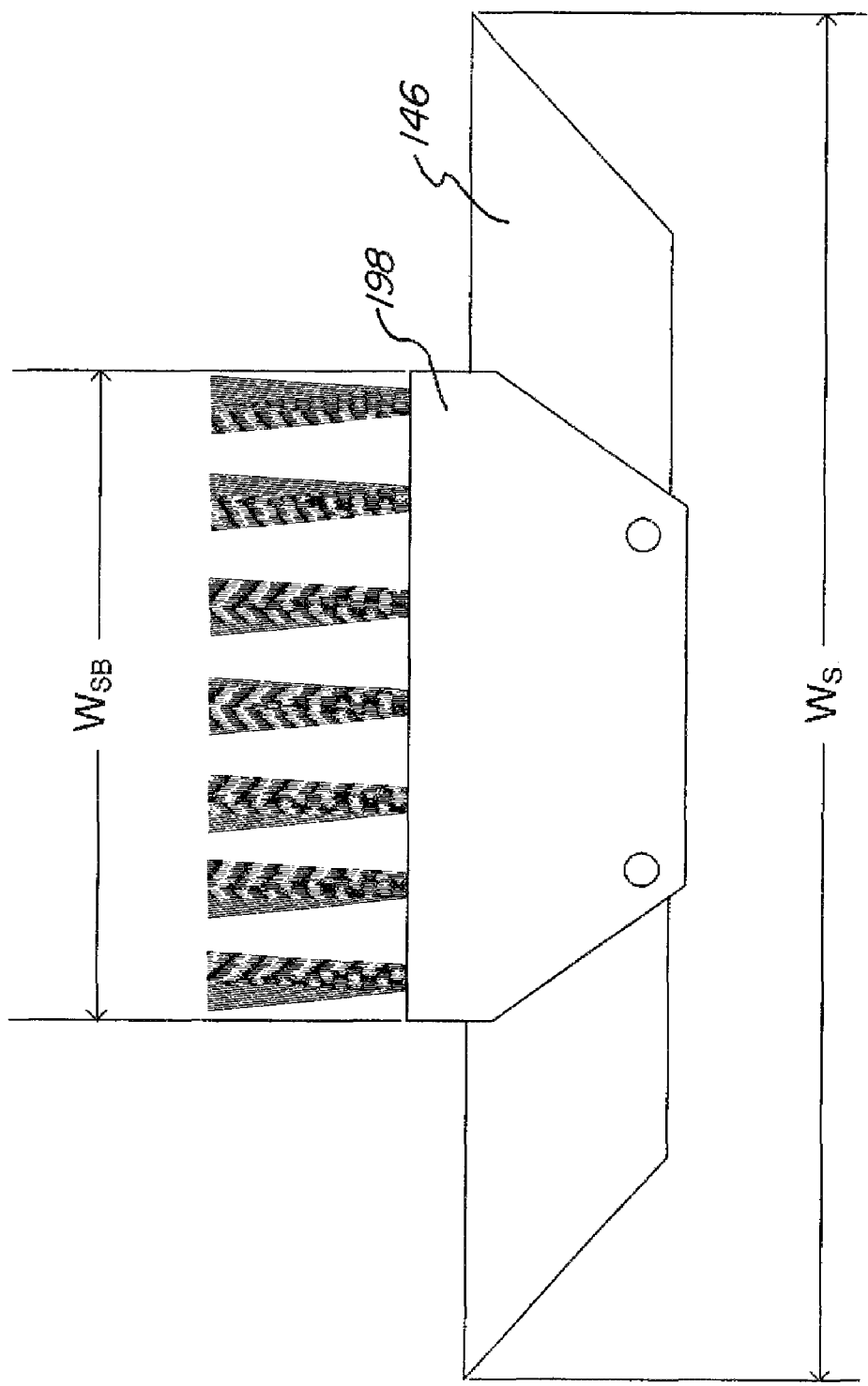
FIG. 9 is a front view of the scraper brush holder attached to a stiff brush.

FIG. 9 is a front view of the scraper 146 with the stiff brush 198 attached to it. As you can see, the scraper 146 has a width $W_s$ that is wider than the width of the stiff brush $W_{sb}$. This allows for the stiff brush 198 to be attached to the scraper 146, while allowing the scraper 146 to still be useable for scraping.

Figure 10:
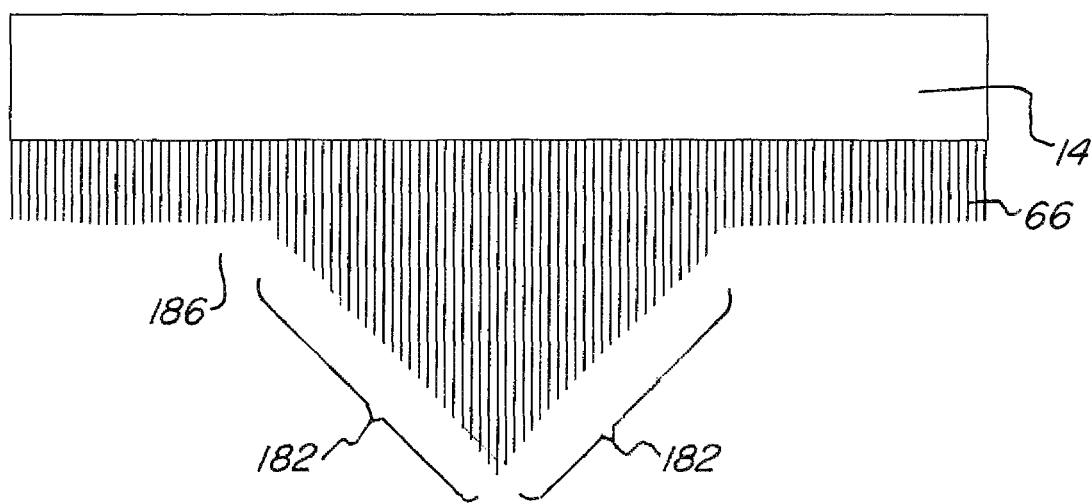
FIG. 10 is a front view of another embodiment of a brush head.

FIG. 10 shows a front view of a brush head 14 without a scraper 98 attached. In this embodiment, the brush bristles 66 form a distinctive "V" shaped. Longer bristles 182 are more stiff than the shorter bristles 186. The longer bristles 182 are configured to clean in between the grates of the bar-b-que grill, and the shorter bristles are configured to clean the top of the grates.

Figure 11:
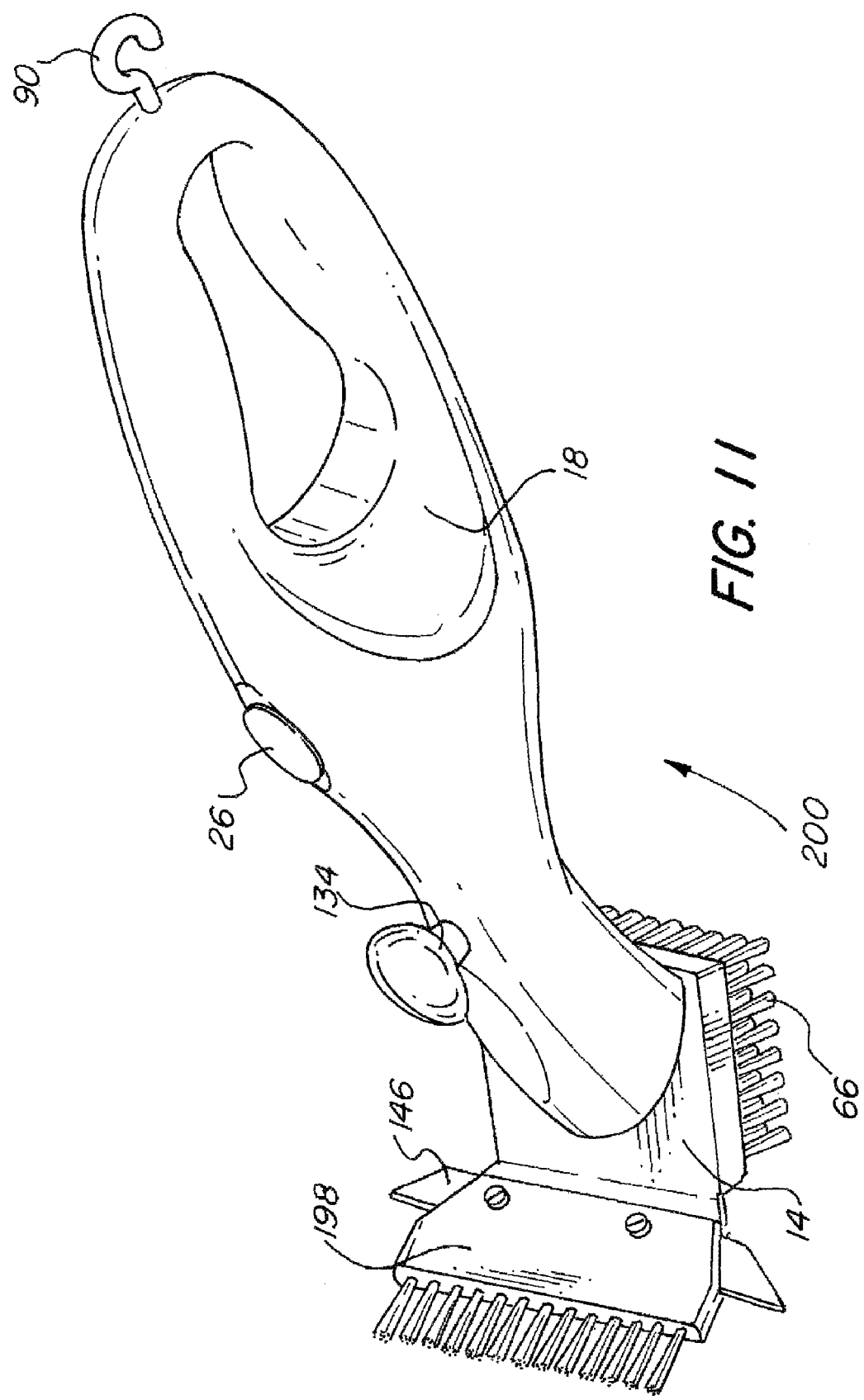
FIG. 11 is a perspective view of toroidal embodiment of a grill brush.

FIG. 11 shows another embodiment of a grill brush 200. In this embodiment, the brush handle 18 is generally toroidal in shape. Other than the toroidal shape of the handle 18, the grill brush 200 works generally the same as the grill brush 110 in FIG. 6. For instance, the interior of the brush handle 18 has a lower interior volume 126 and upper interior volume 122 divided by the spool 134 and in fluid communication with each other through the spool passageway 138 when the spool passageway is orientated for fluid communication between the two volumes 122, 126. Similarly the interior of the brush head is similar to the interior of the brush head in FIG. 6. The reservoir cap 26, may also act as a fluid valve, to allow fluid to travel out of the orifices 58 (not show in this view).

Figure 12:
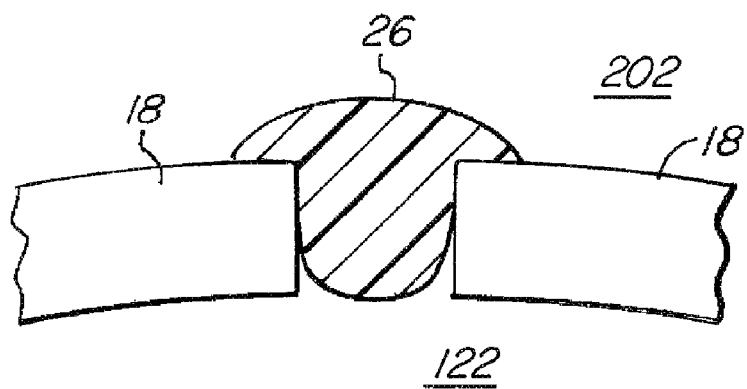
FIG. 12 is a close up view of the reservoir cap in a non-deformed state.
Figure 13:
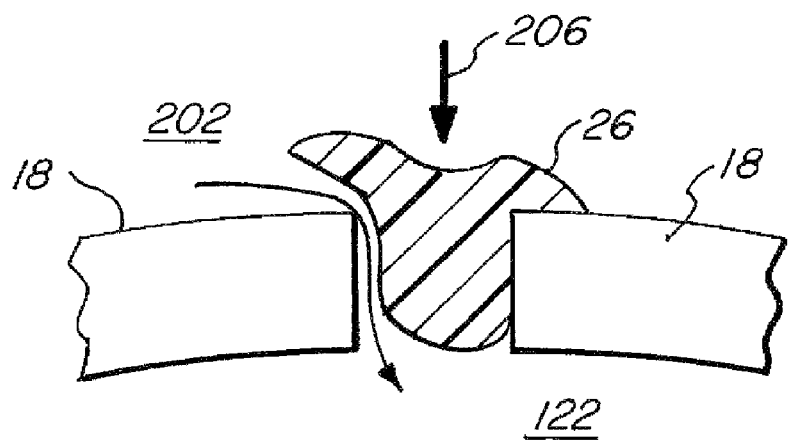
FIG. 13 is a close up view of the reservoir cap in a deformed state.

FIG. 12 shows the reservoir cap 26 in place on the handle 18 and providing a seal between the upper interior volume 122 and the ambient atmosphere 202. FIG. 13 shows the reservoir cap 26 deforming do to a force (illustrated by the arrow 206) such that the seal is broken, and there is fluid communication between ambient atmosphere 202 and the upper interior volume 122. The cap 26, in this embodiment, will be made of a deformable material such as, but not limited to: rubber, foam, nylon, plastic.

The grill brush 10 may be generally made out of a high temperature resistant plastic. The bristles 66, may be made out of stainless steel.

The disclosed grill brush 10 has many advantages. The handle of the brush has a reservoir that can be filled with a fluid such as water, lemon juice, cleaning fluid, which along with the bristles allows one to thoroughly clean a barbeque grill. The brush has an extra long handle to allow one to use more leverage when cleaning a grill. The grill brush can be used a on a hot grill (i.e. a grill that has only recently had the heat turned off or quenched), and thus with the fluid in the reservoir and the stainless steel bristles, one can thoroughly clean a barbeque grill using the heat of the grill to aid in cleaning. Additionally, the grill brush may be used on a hot grill that is still "turned on", that is with the heat source still operating. The extra long handle allows a user to clean a hot grill, without being too close to the heat source. Once the fluid in the grill brush 10 leaves the orifices, the fluid may vaporize (turn to steam if water) and may sterilize the area, thereby providing more cleaning action on the grill.

It should be noted that the terms "first", "second", and "third", and the like may be used herein to modify elements performing similar and/or analogous functions. These modifiers do not imply a spatial, sequential, or hierarchical order to the modified elements unless specifically stated.

While the disclosure has been described with reference to several embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiments disclosed as the best mode contemplated for carrying out this disclosure, but that the disclosure will include all embodiments falling within the scope of the appended claims.

What is claimed is:

1. A grill brush comprising:
   a brush handle with a handle end and a brush end;
   a handle member attached to the handle end, and located at generally an acute angle to the brush handle;
   a knob located generally in the middle of the brush handle
   a fluid reservoir located within the brush handle, the fluid reservoir comprising:
      an upper interior volume; and
      a lower interior volume;
   a reservoir cap removeably attached to the handle member;
   a shut off spool removeably attachable to the brush handle, and located generally between the upper interior volume and the lower interior volume;
   a passage way located in the shut off spool, and configured to stop fluid communication between the upper interior volume, and the lower interior volume when the spool is in a shut configuration, and to allow for fluid communication between the upper interior volume, and the lower interior volume when the spool is in an open configuration;
   a scraper brush holder removeably attachable to the brush end of the brush handle, the scraper brush holder comprising a scraper with a width $W_s$
   a brush head slideably attachable to the scraper brush holder, the brush head comprising:
      a brush head conduit, configurable to be in fluid communication with the lower interior volume;

a brush bristle surface;
a plurality of groups of bristles emanating from the brush bristle surface; and
a plurality of orifices located on the brush bristle surface, and in fluid communication with the brush head conduit.

2. The grill brush of claim 1 further comprising:
a stiff brush attachable to the scraper brush holder, the stiff brush comprising stiff bristles, and the stiff brush having a width of $W_{sb}$, and wherein $W_s$ is greater than $W_{sb}$ such that the scraper can be used with the stiff brush attached to the scraper brush holder.

3. The grill brush of claim 2, wherein each of the stiff bristles have a diameter of about 0.008 inches to about 0.020 inches.

4. The grill brush of claim 1, wherein each of the bristles have a diameter of about 0.005 inches to about 0.012 inches.

5. The grill brush of claim 1, further comprising:
a cap orifice located on the distal end of the reservoir cap, and in fluid communication with the ambient environment;
a cap conduit located within the reservoir cap, and in fluid communication with the cap orifice and in fluid communication with the upper interior volume;
a generally spherical stopper located within the cap conduit, and configured to be able to generally freely travel along a length of the cap conduit; and
at least one raised member located on a proximal end of the cap conduit.

6. A grill brush comprising:
a brush handle with a handle end and a brush end, and wherein the brush handle has a generally toroidal shape;
a fluid reservoir located within the brush handle, the fluid reservoir comprising:
an upper interior volume; and
a lower interior volume;
a reservoir cap located on the brush handle;
a shut off spool removeably attachable to the brush handle, and located generally between the upper interior volume and the lower interior volume;
a passage way located in the shut off spool, and configured to stop fluid communication between the upper interior volume, and the lower interior volume when the spool is in a shut configuration, and to allow for fluid communication between the upper interior volume, and the lower interior volume when the spool is in an open configuration;
a scraper brush holder removeably attachable to the brush end of the brush handle;
a brush head slideably attachable to the scraper brush holder, the brush head comprising:
a brush head conduit, configurable to be in fluid communication with the lower interior volume;
a brush bristle surface;
a plurality of groups of bristles emanating from the brush bristle surface; and
a plurality of orifices located on the brush bristle surface, and in fluid communication with the brush head conduit.

7. The grill brush of claim 6, wherein the reservoir cap is configured to deform under an externally exerted force, thus when deformed providing for fluid communication between the fluid reservoir and an outside atmosphere.

8. The grill brush of claim 6 further comprising:
a stiff brush attachable to the scraper brush holder, the stiff brush comprising stiff bristles, the scraper brush holder having a width of $W_s$ and the stiff brush having a width of $W_{sb}$, and wherein $W_s$ is greater than $W_{sb}$.

9. The grill brush of claim 8, wherein each of the stiff bristles have a diameter of about 0.008 inches to about 0.020 inches.

10. The grill brush of claim 6, wherein each of the bristles have a diameter of about 0.005 inches to about 0.012 inches.

* * * * *